(12) United States Patent
Huang

(10) Patent No.: US 7,093,714 B2
(45) Date of Patent: Aug. 22, 2006

(54) REMOVABLE HOLDING MEMBER FOR STACKED ROOFING WASHERS

(76) Inventor: Wen-Sheng Huang, No. 441-2, Ta Li Road, Ta Li City, Taichung (TW)

( * ) Notice: Subject to any disclaimer, the term of this patent is extended or adjusted under 35 U.S.C. 154(b) by 162 days.

(21) Appl. No.: 10/854,206

(22) Filed: May 27, 2004

(65) Prior Publication Data
US 2005/0263532 A1   Dec. 1, 2005

(51) Int. Cl.
*B65D 85/02*   (2006.01)
*B65H 1/00*    (2006.01)
*B25C 7/00*    (2006.01)

(52) U.S. Cl. ............... 206/493; 206/303; 206/445; 221/1; 221/197; 227/15; 227/18

(58) Field of Classification Search ............ 206/303, 206/445, 493, 499; 221/197, 227, 287, 312 A, 221/1; 227/18, 119, 136, 15
See application file for complete search history.

(56) References Cited

U.S. PATENT DOCUMENTS

| | | | |
|---|---|---|---|
| 4,300,684 A * | 11/1981 | Smith et al. ............... | 206/493 |
| 5,056,684 A * | 10/1991 | Beach et al. ............... | 221/197 |
| 5,163,580 A * | 11/1992 | Beach et al. ............... | 221/1 |
| 5,894,927 A * | 4/1999 | Bennett ..................... | 206/493 |
| 5,927,497 A * | 7/1999 | Baumgartner et al. ...... | 206/493 |
| 6,481,610 B1 * | 11/2002 | Liu et al. .................. | 227/18 |
| 6,502,719 B1 * | 1/2003 | Huang ....................... | 221/312 A |
| 6,659,326 B1 * | 12/2003 | Huang ....................... | 227/18 |
| 6,908,022 B1 * | 6/2005 | Schmitz ..................... | 227/15 |

* cited by examiner

*Primary Examiner*—Bryon Gehman

(57) ABSTRACT

A roofing washers assembly includes a plurality of stacked roofing washers and a positioning roofing washer is located at an end of the stacked roofing washers. An elongate holding member has a removable end piece connected to a first end thereof and the end piece extends through the central aperture in each of the stacked roofing washers and the positioning aperture of the positioning roofing washer. The end piece has expandable spikes which are pushed inward when passing through the positioning washer and then expand outward after the spikes go through the positioning aperture. The end piece is disengaged from the holding member when the holding member is pulled from a second end thereof.

4 Claims, 5 Drawing Sheets

REMOVABLE HOLDING MEMBER FOR STACKED ROOFING WASHERS

FIELD OF THE INVENTION

The present invention relates to a holding member that extends through stacked roofing washers and includes a removable end piece which is disengaged from the holding member by a force.

BACKGROUND OF THE INVENTION

A conventional stacked roofing washers assembly is disclosed in U.S. Pat. No. 5,163,580, and generally includes a plurality of roofing washers which are collated by a flexible member extending through respective central apertures in the roofing washers. A formation such as a knot is formed at an end of the flexible member after the flexible member extends through the roofing washers so that the stacked roofing washers can be hanged when pulled from the other end of the flexible member. The formation can be deformed if the flexible member is forcibly pulled way from the stacked of roofing washers. The deformed knot is so deformed that it is able to be forcibly pulled through the central apertures. Nevertheless, the deformation of the formation cannot be controlled and could be slightly too large to be pulled through the central apertures. Therefore the central apertures could be enlarged or even damaged. This affects the function of the washers when a nail extends through the enlarged central apertures.

The present invention intends to provide a holding member that is made of flexible material and includes a removable end piece which has a flexible and expandable spikes so as to expand to contact the last one washer in the stacked washers. The end piece can be forcibly disengaged from the holding member by pulling the holding member.

SUMMARY OF THE INVENTION

The present invention relates to a roofing washers assembly which comprises a plurality of stacked roofing washers and each roofing washer has a central aperture. A positioning roofing washer is located at an end of the stacked roofing washers and has a positioning aperture which is smaller than the central aperture. An elongate holding member has a removable end piece connected to a first end thereof and the end piece has expandable spikes extending outward from the end piece. The holding member extends through the central apertures of the stacked roofing washers by the end piece and the expandable spikes are pushed inward when passing through the positioning aperture, and then expand outward after the expandable spikes passed out the positioning aperture.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figures 1, 2:
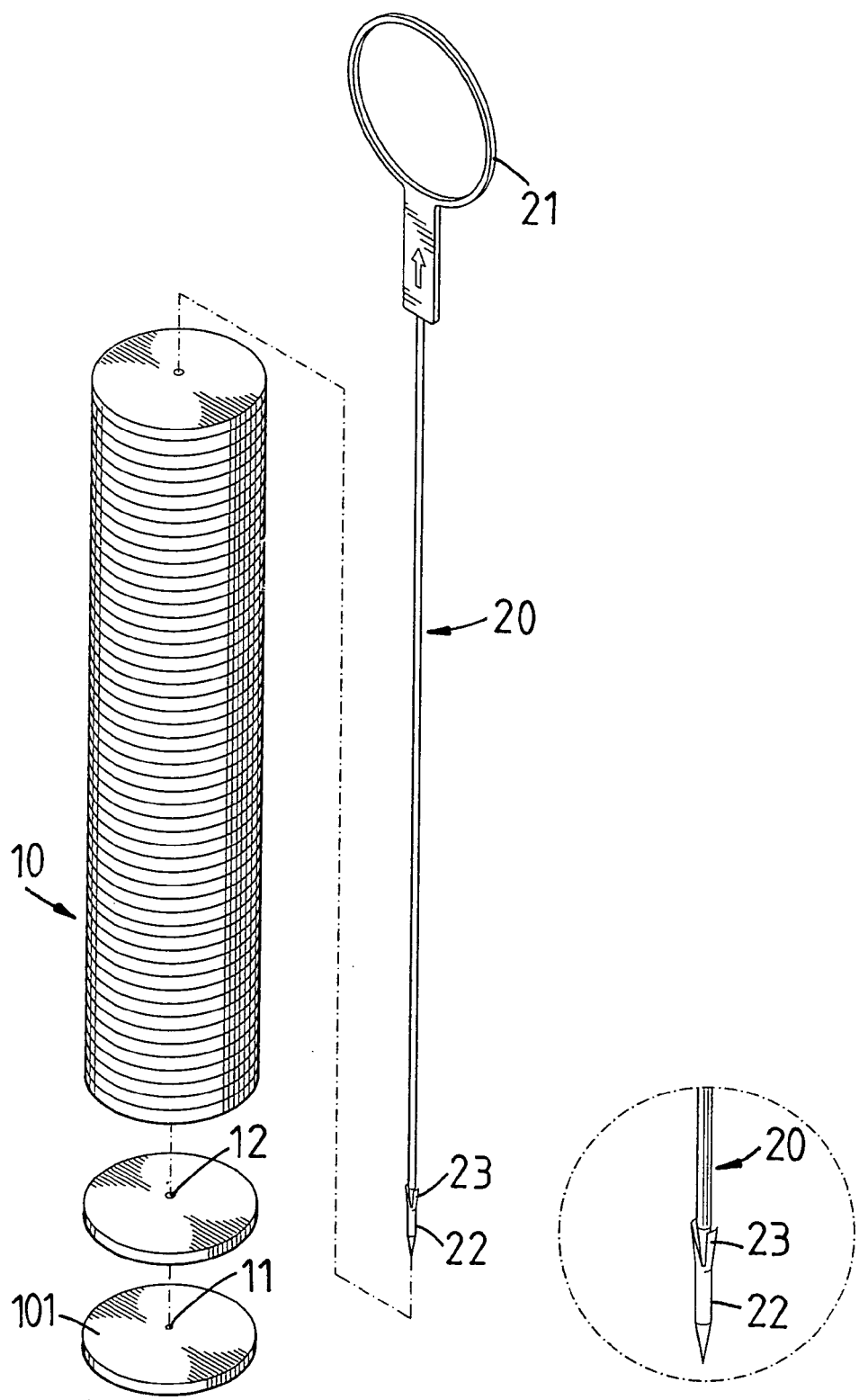
FIG. 1 is an exploded view to show the stacked roofing washers and the holding member of the present invention.
FIG. 2 is an enlarged view to show the end piece connected to the holding member.
Figure 3:
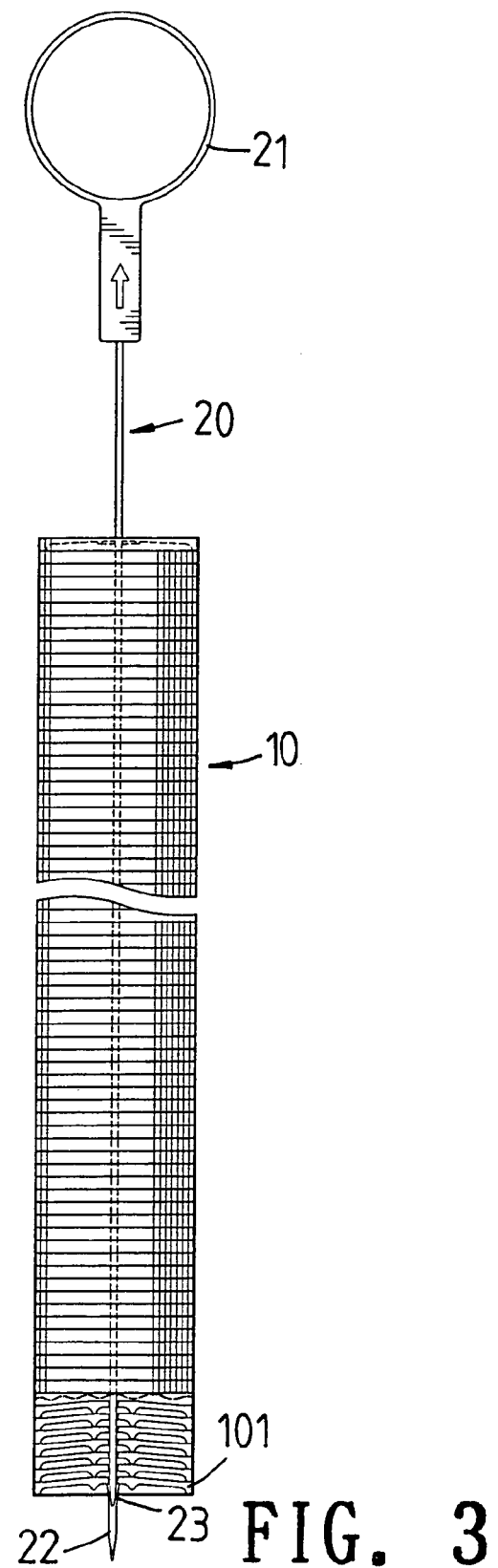
FIG. 3 shows the stacked roofing washers are collected by the holding member and the end piece.

Referring to FIGS. 1 to 3, the stacked roofing washers assembly of the present invention comprises a plurality of stacked roofing washers 10 and each roofing washer 10 has a central aperture 12. A positioning roofing washer 101 is located at an end of the stacked roofing washers 10 and has a positioning aperture 11 which is smaller than the central aperture 12.

An elongate holding member 20 has a sharp tip (see FIG. 6) at a first end 20 thereof and the sharp tip is inserted and connected to a removable end piece 22. The end piece 22 has expandable spikes 23 extending outward from the end piece 22 and being capable of being pushed inward. The end piece 22 has a sharp tip so that the holding member 20 conveniently extends through the central apertures 12 of the stacked roofing washers 10 and the positioning washer 101 by the end piece 22. A ring 21 is connected to a second end of the elongate holding member 20.

Figure 4:
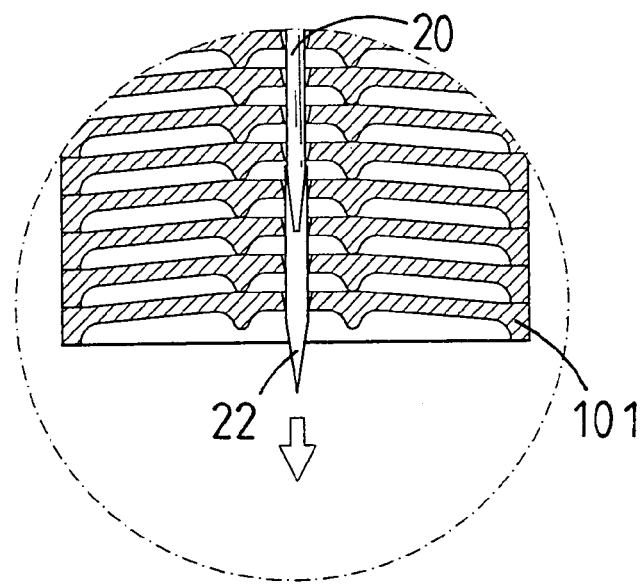
FIG. 4 shows the expandable spikes of the end piece are pushed inward during passing through the positioning aperture.
Figure 5:
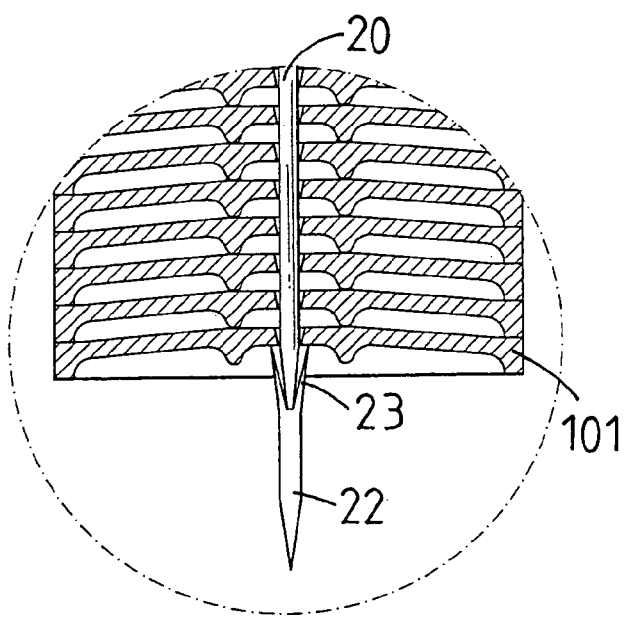
FIG. 5 shows the expandable spikes of the end piece expand outward after the spikes went through the positioning aperture.

As shown in FIGS. 4 and 5, the expandable spikes 23 are pushed inward when passing through the positioning aperture 11 and then expand outward after the expandable spikes 23 went out the positioning aperture 11. The expandable spikes 23 contact an underside of the positioning roofing washer 101.

Figures 6, 7:
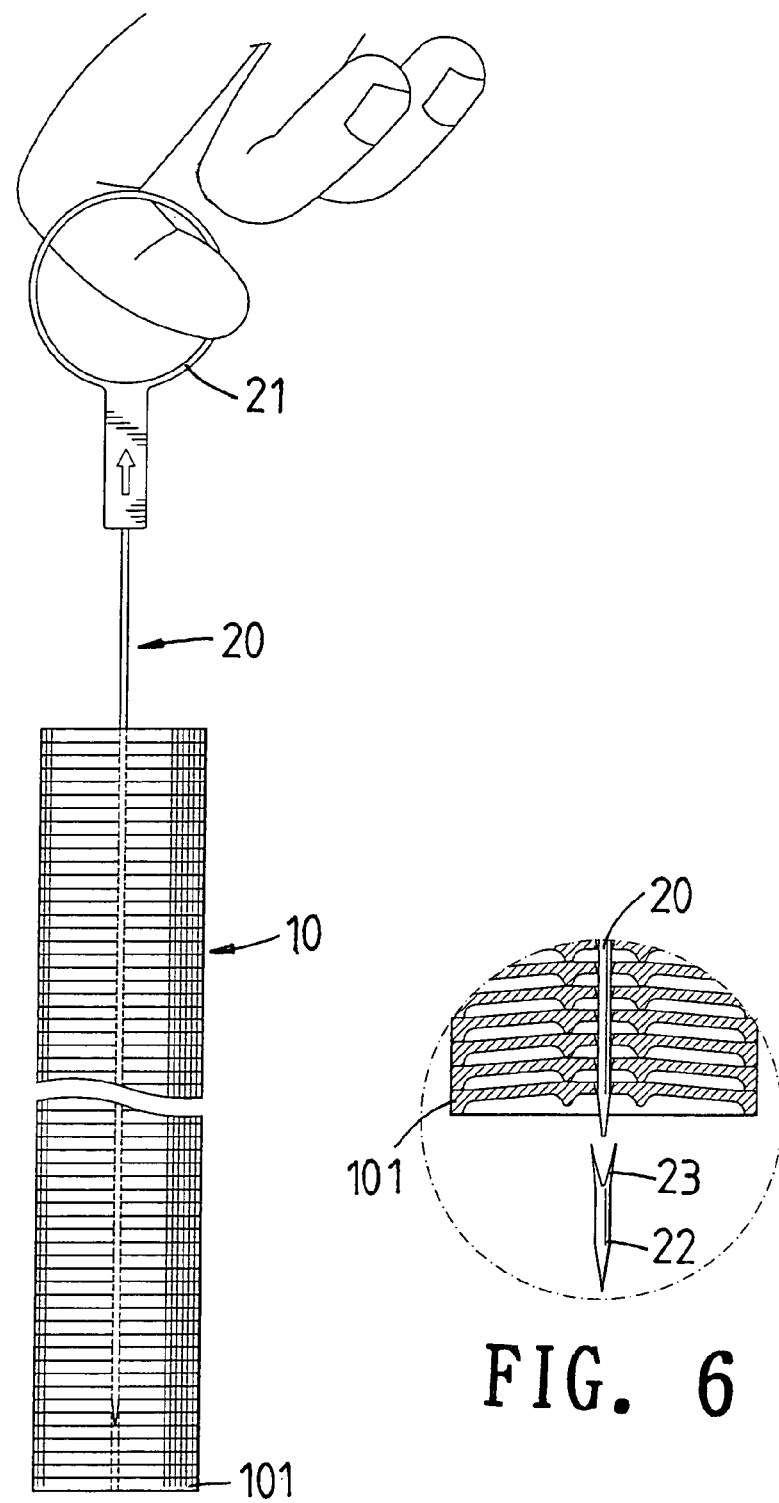
FIG. 6 shows the end piece is disengaged from the holding member when pulling the holding member.
FIG. 7 shows the holding member is pulling through the stacked roofing washers.
Figure 8:
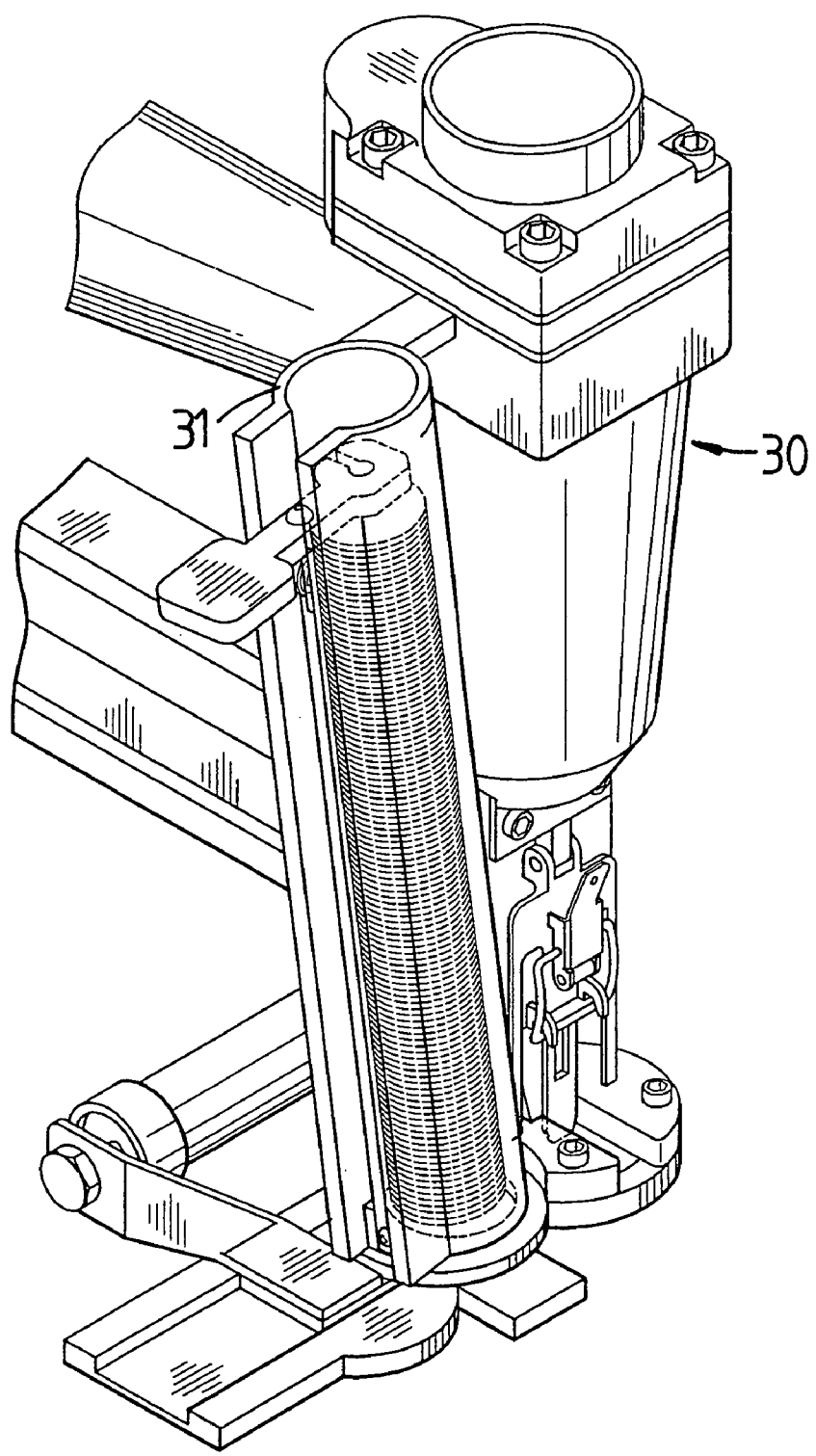
FIG. 8 shows the stacked roofing washers are received in a magazine of the roofing staple gun.

Referring to FIGS. 6, 7 and 8, the stacked roofing washers 10 can be hanged by holding the ring 21 so that the user can easily put the stacked roofing washers 10 into the magazine 31 of the roofing staple gun 10. The user then pulls the ring 20 away from the stacked roofing washers 10, the end piece 22 is forcibly disengaged from the first end of the holding member 20 and the sharp tip at the first end of the holding member 20 can easily go through the positioning aperture 11 and the central apertures 12.

While we have shown and described the embodiment in accordance with the present invention, it should be clear to those skilled in the art that further embodiments may be made without departing from the scope of the present invention.

What is claimed is:

1. A roofing washers assembly comprising:
   a plurality of stacked roofing washers and each roofing washer having a central aperture, a positioning roofing washer located at an end of the stacked roofing washers and having a positioning aperture which is smaller than the central aperture, and
   an elongate holding member having a removable end piece connected to a first end thereof, the end piece having expandable spikes extending outward from the end piece and the expandable spikes being capable of being pushed inward, the end piece of the holding member extending through the central apertures of the stacked roofing washers, the expandable spikes being pushed inward when passing through the positioning aperture and expanding outward after the expandable spikes pass through the positioning aperture.

2. The assembly as claimed in claim 1, wherein a ring is connected to a second end of the elongate holding member.

3. The assembly as claimed in claim 1, wherein the end piece has a sharp tip.

4. The assembly as claimed in claim 1, wherein the end piece of the holding member has a sharp tip.

\* \* \* \* \*